United States Patent Office 3,089,880
Patented May 14, 1963

3,089,880
19-NOR-PROGESTERONE
Josef Fried, Princeton, and Mariano A. Guiducci, Edison, N.J., assignors to Olin Mathieson Chemical Corporation, New York, N.Y., a corporation of Virginia
No Drawing. Filed Aug. 4, 1961, Ser. No. 129,235
7 Claims. (Cl. 260—397.3)

This invention relates to, and has for its objects the provisions of new physiologically active steroids, methods for preparing the same, and intermediates useful in such preparations.

The final products of this invention include steroids of the general formulae and wherein R is in either the alpha or beta position and represents hydrogen or lower alkyl (preferably methyl). These compounds are physiologically-active substances which possess progestational activity and hence can be used in lieu of known progestational agents, such as progesterone, in the treatment of habitual abortion. For this purpose, they can be administered in the same manner as progesterone, for example, the dosage being adjusted for the relative potency of the particular steroid.

The compounds of this invention can be prepared by reducing a compound of the formula wherein R is as hereinbefore defined and R' is lower alkyl by treatment with lithium and liquid ammonia. Suitable starting materials include the 16α,17α-acetonides of 3-(lower alkoxy)-19-nor-1,3,5(10)-pregnatriene-16α,17α-diol-20-ones (e.g., 3-methoxy-19-nor-1,3,5(10)-pregnatriene-16α,17α-diol-20-one) and 3-(lower alkoxy)-6-(lower alkyl)-19-nor-1,3,5(10)-pregnatriene - 16α,17α - diol-20-ones (e.g.,
3-methoxy - 6α - methyl-19-nor-1,3,5(10) - pregnatriene-16α,17α-diol-20-one and 3-methoxy-6β-methyl-19-nor-1,3,5(10)-pregnatriene-16α,17α-diol-20-one). These starting steroids can be prepared by the method described in our application, Serial No. 129,233, filed on even date herewith.

The reaction yields new intermediates of this invention of the formula wherein R and R' are as hereinbefore defined.

These enols are then hydrolyzed. The nature of the product formed will depend on the conditions of the hydrolysis. Thus, if a mineral acid (e.g., dilute sulfuric acid and dilute hydrochloric acid) is used as the hydrolyzing agent, a 4-pregnene of the following formula is formed:

wherein R is as hereinbefore defined.

If, however, the hydrolysis is carried out by use or an organic carboxylic acid (e.g., oxalic acid), then a 5(10)-pregnene of the following formula is formed:

wherein R is as hereinbefore defined.

The resulting 16,20-dihydroxy compounds are then oxidized, as by treatment with a hexavalent chromium compound (e.g., chromic oxide) to yield the final 16,20-diketo compounds of this invention.

The following examples illustrate the invention (all temperatures being in centigrade):

EXAMPLE 1

*19-Nor-3-Methoxy-2,5(10)-Pregnadiene-16α,20β-Diol*

A solution of 100 mg. of 3-methoxy-19-nor-1,3,5(10)-pregnatriene - 16α,17α - diol-20-one 16α,17α-acetonide in 35 ml. of dry ether is added to 50 ml. of liquid ammonia followed by 100 mg. of lithium wire in small portions. After stirring for 40 minutes, while immersed in a Dry Ice-acetone bath, 5 ml. of methanol is added, which is followed by an additional 400 mg. of lithium wire. The resulting reaction mixture is stirred until all the ammonia has evaporated, following which water is added and the mixture is extracted with ether. The combined ether extracts are washed with saturated sodium chloride solution, dried over sodium sulfate and evaporated to dryness in vacuo. Crystallization of the crude product from acetone-hexane yields about 72 mg. of 3-methoxy-19-nor-2,5(10)-pregnadiene-16α,20β-diol of the following properties: M.P. about 178–179°; $[\alpha]_D^{23}$+97° (c. .94 in chlf.);

$\lambda_{max}^{KBr}$ 3.06, 5.88, 5.98μ

EXAMPLE 2

*6α-Methyl-19-Nor-3-Methoxy-2,5(10)-Pregnadiene-16α,20β-Diol*

Following the procedure of Example 1 but substituting an equivalent amount of 6α-methyl-3-methoxy-19-nor-1,3,5(10) - pregnatriene - 16α,17α-diol-20-one 16α,17α-acetonide for the acetonide, 6α-methyl-19-nor-3-methoxy-2,5(10)-pregnadiene-16α,20β-diol is obtained.

EXAMPLE 3

*6β-Methyl-19-Nor-3-Methoxy-2,5(10)-Pregnadiene-16α,20β-Diol*

Following the procedure of Example 1 but substituting an equivalent amount of 6β-methyl-3-methoxy-19-nor-1,3,5(10)-pregnatriene-16α,17α-diol-20-one 16α,17α-acetonide for the acetonide, 6β-methyl-19-nor-3-methoxy-2,5(10)-pregnadiene-16α,20β-diol is obtained.

EXAMPLE 4

*19-Nor-4-Pregnene-16α,20β-Diol-3-One*

To a solution of 16 mg. of 3-methoxy-19-nor-2,5(10)-pregnadiene-16α,20β-diol in 1.25 ml. of methanol is added 0.75 ml. of 0.3N hydrochloric acid. The mixture is refluxed for 15 minutes, cooled and extracted with chloroform. The combined chloroform extracts are washed with water, dried over sodium sulfate and evaporated to dryness in vacuo. Crystallization of the crude product (14 mg.) from ether-hexane yields about 8 mg. of 19-nor-4-pregnene-16α,20β-diol-3-one of the following properties: M.P. about 198–200°; $[\alpha]_D$+32° (c. .48 in chlf.);

$\lambda_{max}^{alc.}$ 239 mμ (ε=17,000); $\lambda_{max}^{Nujol}$ 2.98, 5.96 and 6.14μ

*Analysis.*—Calcd. for $C_{20}H_{30}O_3$ (318): C, 75.43; H, 9.50. Found: C, 75.89; H, 9.40.

EXAMPLE 5

*6α-Methyl-19-Nor-4-Pregnene-16α,20β-Diol-3-One*

Following the procedure of Example 4 but substituting an equivalent amount of 6α-methyl-3-methoxy-19-nor-2,5(10)-pregnadiene-16α,20β-diol for the steroid reactant, 6α - methyl-19-nor-4-pregnene-16α,20β-diol-3-one is obtained.

EXAMPLE 6

*6β-Methyl-19-Nor-4-Pregnene-16α-20β-Diol-3-One*

Following the procedure of Example 4 but substituting an equivalent amount of 6β-methyl-3-methoxy-19-nor-2,5(10)-pregnadiene-16α-20β-diol for the steroid reactant, 6β - methyl-19-nor-4-pregnene-16α,20β-diol-3-one is obtained.

EXAMPLE 7

*19-Nor-5(10)-Pregnene-16α,20β-Diol-3-One*

To a solution of 16 mg. of 3-methoxy-19-nor-2,5(10)-pregnadiene-16α-20β-diol in 1.25 ml. of methanol is added 0.9 ml. of a solution containing 230 mg. of oxalic acid in 3 ml. of water. The reaction mixture is stirred at room temperature, poured into ice-water, and extracted with chloroform. The combined chloroform extracts are washed with sodium bicarbonate solution and saturated sodium chloride solution, dried over sodium sulfate and evaporated to dryness in vacuo.

EXAMPLE 8

*6α-Methyl-19-Nor-5(10)-Pregnene-16α-20β-Diol-3-One*

Following the procedure of Example 7 but substituting an equivalent amount of 6α-methyl-3-methoxy-19-nor-2,5(10)-pregnadiene-16α,20β-diol for the steroid reactant, 6α - methyl - 19-nor-5(10)-pregnene-16α,20β-diol-3-one is obtained.

EXAMPLE 9

*6β-Methyl-19-Nor-5(10)-Pregnene-16α,20β-Diol-3-One*

Following the procedure of Example 7 but substituting an equivalent amount of 6β-methyl-3-methoxy-19-nor-2,5(10)-pregnadiene-16α,20β-diol for the steroid reactant, 6β - methyl - 19-nor-5(10)-pregnene-16α,20β-diol-3-one is obtained.

EXAMPLE 10

*19-Nor-16-Ketoprogesterone*

To a solution of 10 mg. of 19-nor-4-pregnene-16α,20β-diol-3-one in 2 ml. of acetone is added dropwise 0.30 ml. of chromic acid-sulfuric acid reagent containing 20 mg. of $CrO_3$ and 32 mg. of $H_2SO_4$ in 1 ml. of 90% aqueous acetone. The reagent is consumed rapidly and after stirring for a total of 15 minutes methanol is added to reduce the excess chromic acid. Water is added and the mixture extracted with chloroform. The combined chloroform extracts are washed with water, dried over sodium sulfate and evaporated to dryness in vacuo. The residual 19-nor-16-ketoprogesterone gives a strong positive ferric chloride test.

EXAMPLE 11

*6α-Methyl-19-Nor-16-Ketoprogesterone*

Following the procedure of Example 10 but substituting an equivalent amount of 6α-methyl-19-nor-4-pregnene-16α,20β-diol-3-one for the steroid reactant, 6α-methyl-19-nor-16-ketoprogesterone is obtained.

EXAMPLE 12

*6β-Methyl-19-Nor-16-Ketoprogesterone*

Following the procedure of Example 10 but substituting an equivalent amount of 6β-methyl-19-nor-4-pregnene-16α,20β-diol-3-one for the steroid reactant, 6β-methyl-19-nor-16-ketoprogesterone is obtained.

EXAMPLE 13

*19-Nor-5(10)-Pregnene-3,16,20-Trione*

Following the procedure of Example 10 but substituting an equivalent amount of 19-nor-5(10)-pregnene-16α,20β-diol-3-one for the steroid reactant, 19-nor-5(10)-pregnene-3,16,20-trione is obtained.

EXAMPLE 14

*6α-Methyl-19-Nor-5(10)-Pregnene-3,16,20-Trione*

Following the procedure of Example 10 but substituting an equivalent amount of 6α-methyl-19-nor-5(10)-pregnene-16α-20β-diol-3-one for the steroid reactant, 6α-methyl-19-nor-5(10)-pregnene-3,16,20-trione is obtained.

EXAMPLE 15

*6β-Methyl-19-Nor-5(10)-Pregnene-3,16,20-Trione*

Following the procedure of Example 10 but substituting an equivalent amount of 6β-methyl-19-nor-5(10)-pregnene-16α,20β-diol-3-one for the steroid reactant, 6β-methyl-19-nor-5(10)-pregnene-3,16,20-trione is obtained.

This invention may be variously otherwise embodied within the scope of the appended claims.

What is claimed is:

1. A compound selected from the group consisting of 6 - (lower alkyl - 19 - nor-16-ketoprogesterone, 19-nor-5

(10)-pregnene-3,16,20-trione and 6-(lower alkyl)-19-nor-5(10)-pregnene-3,16,20-trione.

2. 6α-methyl-19-nor-16-ketoprogesterone.
3. 6β-methyl-19-nor-16-ketoprogesterone.
4. A compound selected from the group consisting of 19-nor-3-(lower alkoxy)-2,5(10)-pregnadiene-16α,20β-diol and 6-(lower alkyl)-19-nor-3-(lower alkoxy)-2,5(10)-pregnadiene-16α,20β-diol.
5. 19-nor-3-methoxy-2,5(10)-pregnadiene-16α,20β-diol.
6. A compound selected from the group consisting of 6-(lower alkyl)-19-nor-4-pregnene-16α,20β-diol-3-one, 19-nor-5(10)-pregnene-16α,20β-diol-3-one and 6-(lower alkyl)-19-nor-5(10)-pregnene-16α,20β-diol-3-one.
7. A process for preparing a compound selected from the group consisting of 19-nor-3-(lower alkoxy)-2,5(10)-pregnadiene-16α,20β-diol and 6-(lower alkyl)-19-nor-3-(lower alkoxy)-2,5(10)-pregnadiene-16α,20β-diol, which comprises treating a corresponding compound selected from the group consisting of 19-nor-3-(lower alkoxy)-1,3,5(10)-pregnatriene-16α,17α-diol-20-one 16α,17α-acetonide and 6-(lower alkyl)-19-nor-3-(lower alkoxy)-1,3,5(10)-pregnatriene-16α,17α-diol-20-one 16α,17α-acetonide with lithium and liquid ammonia.

References Cited in the file of this patent
UNITED STATES PATENTS
2,799,690    Fried et al. _____ July 16, 1957

OTHER REFERENCES
Fieser et al.: Steroids (1959), Reinhold Pub. Corp. p. 589.